United States Patent
Gold et al.

(10) Patent No.: US 10,471,695 B2
(45) Date of Patent: Nov. 12, 2019

(54) METHODS AND THERMAL STRUCTURES FOR ADDITIVE MANUFACTURING

(71) Applicant: GENERAL ELECTRIC COMPANY, Schenectady, NY (US)

(72) Inventors: Scott Alan Gold, Waynesville, OH (US); Zachary David Fieldman, Cincinnati, OH (US); Daniel Joerger, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 15/335,116

(22) Filed: Oct. 26, 2016

(65) Prior Publication Data

US 2018/0111334 A1    Apr. 26, 2018

(51) Int. Cl.
| | | |
|---|---|---|
| *B33Y 10/00* | (2015.01) |
| *B22F 3/105* | (2006.01) |
| *B22F 5/00* | (2006.01) |
| *B29C 64/153* | (2017.01) |
| *B29C 64/40* | (2017.01) |
| *B29L 9/00* | (2006.01) |

(52) U.S. Cl.
CPC ............ *B33Y 10/00* (2014.12); *B22F 3/1055* (2013.01); *B22F 5/003* (2013.01); *B29C 64/153* (2017.08); *B29C 64/40* (2017.08); *B22F 2003/1058* (2013.01); *B29L 2009/00* (2013.01); *Y02P 10/295* (2015.11)

(58) Field of Classification Search
CPC ..................................................... B33Y 10/00
See application file for complete search history.

(56) References Cited

U.S. PATENT DOCUMENTS

| | | |
|---|---|---|
| 4,863,538 A | 9/1989 | Deckard |
| 5,460,758 A | 10/1995 | Langer et al. |
| 5,529,471 A | 6/1996 | Khoshevis |
| 5,656,230 A | 8/1997 | Khoshevis |

(Continued)

FOREIGN PATENT DOCUMENTS

| | | |
|---|---|---|
| EP | 2570595 A1 | 3/2013 |
| EP | 2 910 362 A1 | 8/2015 |

(Continued)

OTHER PUBLICATIONS

Cooper et al. "Contact-free support structures for part overhangs in powder-bed metal additive manufacturing" (May 2006).*

(Continued)

*Primary Examiner* — Austin Murata
(74) *Attorney, Agent, or Firm* — Dority & Manning, P.A.

(57) ABSTRACT

The present disclosure generally relates to methods for additive manufacturing (AM) that utilize thermal dissipation support structures in the process of building objects, as well as novel thermal dissipation support structures to be used within these AM processes. The thermal dissipation support structures include at least one sacrificial structure that is separated from the object by a portion of unfused powder. The sacrificial structure increases a thermal dissipation rate of at least a portion of the object such that such that thermal gradients in the object remain below a specified threshold that prevents deformation of the object.

21 Claims, 6 Drawing Sheets

(56) References Cited

U.S. PATENT DOCUMENTS

| | | | |
|---|---|---|---|
| 5,837,960 | A | 11/1998 | Lewis et al. |
| 5,897,825 | A | 4/1999 | Fruth et al. |
| 6,471,800 | B2 | 10/2002 | Jang et al. |
| 6,925,346 | B1 | 8/2005 | Mazumder et al. |
| 6,995,334 | B1 | 2/2006 | Kovacevic et al. |
| 7,381,921 | B2 | 6/2008 | Hagemeister et al. |
| 7,435,072 | B2 | 10/2008 | Collins et al. |
| 8,470,234 | B2 | 6/2013 | Clark |
| 8,506,836 | B2 | 8/2013 | Szuromi et al. |
| 8,684,069 | B2 | 4/2014 | Mottin et al. |
| 2002/0062909 | A1 | 5/2002 | Jang et al. |
| 2013/0071562 | A1* | 3/2013 | Szuromi ............... B22F 3/1055 427/237 |
| 2013/0316084 | A1 | 11/2013 | Szuromi et al. |
| 2014/0251481 | A1 | 9/2014 | Kroll et al. |
| 2014/0335313 | A1* | 11/2014 | Chou ..................... G06F 17/50 428/156 |
| 2015/0021379 | A1 | 1/2015 | Albrecht et al. |
| 2016/0243620 | A1* | 8/2016 | Butcher .................. B23P 15/02 |
| 2017/0232511 | A1 | 8/2017 | Fieldman et al. |
| 2017/0232512 | A1 | 8/2017 | Joerger |
| 2017/0232670 | A1 | 8/2017 | Joerger et al. |
| 2017/0232671 | A1 | 8/2017 | Fieldman |
| 2017/0232672 | A1 | 8/2017 | Fieldman et al. |
| 2017/0232682 | A1 | 8/2017 | Alcantara Marte et al. |
| 2017/0232683 | A1 | 8/2017 | Alcantara Marte et al. |
| 2018/0178446 | A1* | 6/2018 | Nosenzo ................ G06F 17/50 |

FOREIGN PATENT DOCUMENTS

| | | |
|---|---|---|
| EP | 3 050 650 A1 | 8/2016 |
| WO | WO 2012/001324 A1 | 1/2012 |
| WO | WO 2014/071135 A1 | 5/2014 |

OTHER PUBLICATIONS

Christensen, N., et al., "Distribution of Temperatures in Arc Welding," British Welding Journal, vol. 12, No. 2, pp. 54-75 (Feb. 1965).

Cooper, K., et al., "Contact-Free Support Structures for Part Overhangs in Powder-Bed Metal Additive Manufacturing," Rapid Conference and Exposition, pp. 1-12 (May 2016).

Nunes, A.C., "An Extended Rosenthal Weld Model," Welding Research Supplement, vol. 62, No. 6, pp. 165-s-170-s (Jun. 1983).

Rosentahl, D., and Mass, C., "The Theory of Moving Sources of Heat and Its Application to Metal Treatments," Transactions of the American Society of Mechanical Engineers, vol. 43, pp. 849-866 (Nov. 1946).

Rybicki, E.F., et al., "A Finite-Element Model for Residual Stresses and Deflections in Girth-Butt Welded Pipes," Journal of Pressure Vessel Technology, vol. 100, Issue 3, pp. 256-262 (Aug. 1, 1978) (Abstract).

Xiong, J., et al., "Bead geometry prediction for robotic GMAW-based rapid manufacturing through a neural network and a second-order regression analysis," Journal of Intelligent Manufacturing, vol. 25, Issue 1, pp. 157-163 (Feb. 2014) (Abstract).

International Search Report and Written Opinion issued in connection with corresponding PCT Application No. PCT/US2017/053456 dated Dec. 22, 2017.

Carter Jr. et al., General Electric, "Direct Laser Sintering of Metals", (Abstract), pp. 51-59.

Forderhase et al., "Reducing or Eliminating Curl on Wax Parts Produced in the Sinterstation™," 2000 System, (Abstract) pp. 94-100.

Jacobson et al., "Practical Issues in the Application of Direct Metal Laser Sintering," (Abstract), pp. 728-739.

* cited by examiner

METHODS AND THERMAL STRUCTURES FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress relief process. Additional thermal, mechanical, and chemical post processing procedures can be used to finish the part 122.

The apparatus 100 is controlled by a computer executing a control program. For example, the apparatus 100 includes a processor (e.g., a microprocessor) executing firmware, an operating system, or other software that provides an interface between the apparatus 100 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly.

It is possible that during laser sintering/melting portions of a three-dimensional object may dissipate heat in an undesirable manner. For example, a melted portion that is surrounded by unmelted powder may be thermally insulated by the unmelted powder. Such a melted portion may not cool and solidify quickly enough. For example, if the melted portion does not solidify before the recoater 116 applies a new layer of powder, the melted portion may be disturbed by the recoater 116. Additionally, such a melted portion may solidify but retain sufficient heat to facilitate large thermal gradients within the three-dimensional object leading to deformation of the part. Such deformation may lead to a finished object that does not meet geometrics specifications or to the part contacting the recoater during the build process, further deforming the part, damaging the recoater, and/or disrupting the build process.

In view of the above, it can be appreciated that there are problems, shortcomings or disadvantages associated with AM techniques, and that it would be desirable if improved methods and structures for controlling temperatures during AM processes were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes: (a) irradiating a layer of powder in a powder bed with an energy beam in a series of scan lines to form a fused region; (b) providing a subsequent layer of powder over the powder bed by passing a recoater arm over the powder bed from a first side of the powder bed to a second side of the powder bed; and (c) repeating steps (a) and (b) until the object and at least one support structure is formed in the powder bed. The at least one support structure includes a sacrificial structure separated from the object by a portion of unfused powder. A rate of thermal dissipation from areas of each cross-section of the object are increased by a presence of the sacrificial structure to maintain a thermal dissipation rate of each layer to be within specification or control limits of thermal dissipation for the object.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

During various additive manufacturing processes such as DMLM and DMLS, heat from a previously scanned portion of an object may impact the scanning of a nearby portion of the object. For example, the heat may lead to unintentional melting or sintering of powder, which may result in unintentionally fused portions of the object or an otherwise deformed object. If an entire object (e.g., 202, 204, and 206) were to be heated uniformly, for example in an oven with the temperature ramped up slowly to some final value such that no significant thermal gradient forms within the object, the object would expand as it heats, but it would do so uniformly over the entire volume of the part with the volume change being described by the material coefficient of thermal expansion. In general, solids tend to expand when heated and contract when cooled. In a laser additive manufacturing process, thermal gradients are inevitably created within the object being manufactured. The material close to the most recently welded or sintered layer gets very hot and wants to expand while the material far from the weld remains at a much lower temperature and does not expand. This results in a virtual tug-of-war between the thermal stress of expansion in hot material and the material strength of the cooler material. If the thermal stress is sufficient to overcome the material strength, the part will deform, resulting in a failure to meet a geometric specification or even cracking of the part. As thermal gradients in this process are inevitable, the challenge is to control the thermal gradient such that the thermal stress does not exceed the strength of the material and result in a deformed or cracked finished part. The thermal gradient required to cause such deformation will depend on the thermal and mechanical properties of the material, as well as the geometry of the part and thermal properties of the surrounding powder bed.

Figure 1:
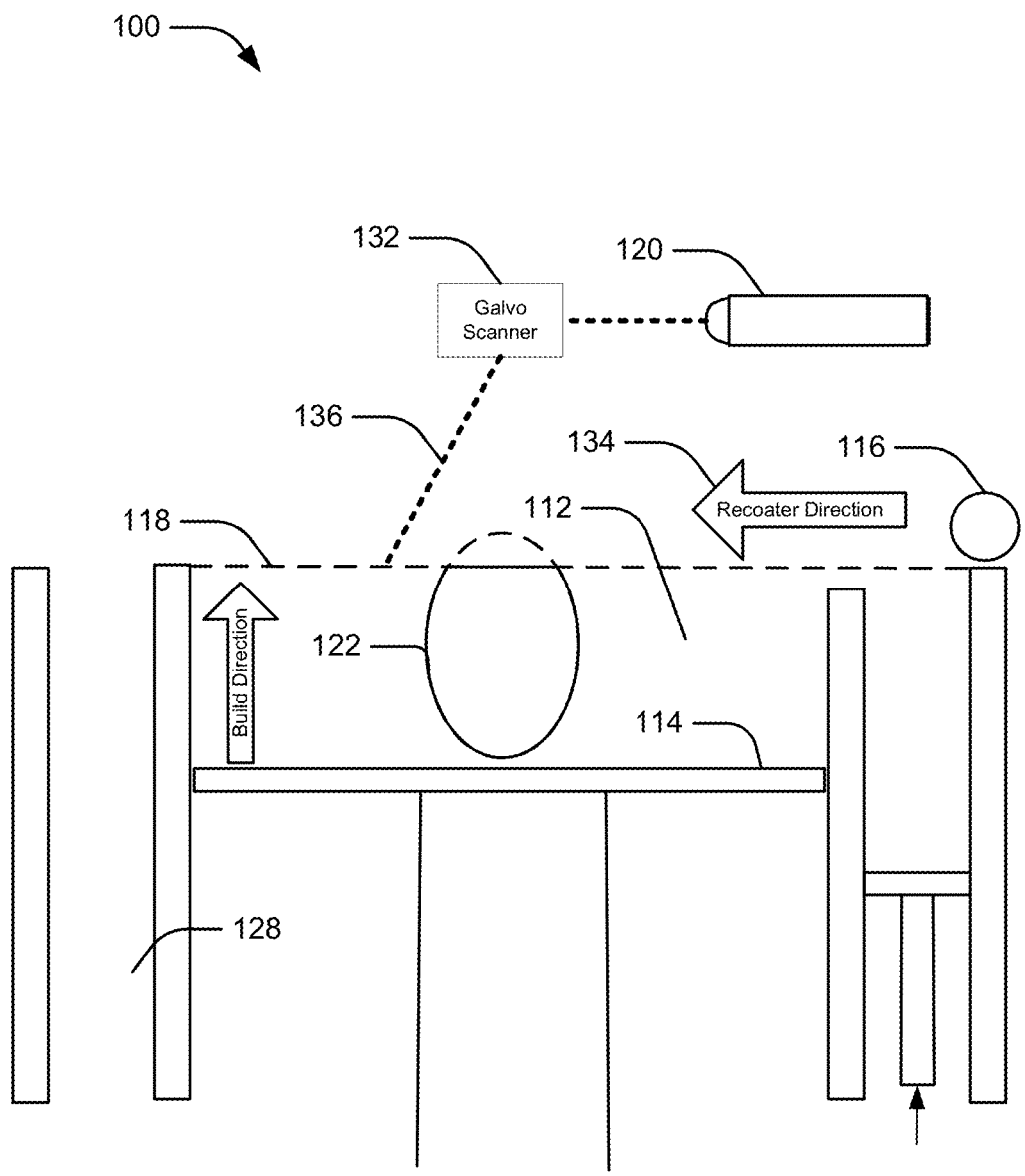
FIG. 1 is schematic diagram showing an example of a conventional apparatus for additive manufacturing.

The disclosure provides for thermal dissipation supports for regulating thermal gradients in the object during fabrication. For example, a thermal dissipation support may be added to a three-dimensional computer model to provide a structure that increases a rate of thermal dissipation from the object. The presence of the thermal dissipation support increases the thermal dissipation rate of the object such that the thermal dissipation rate for each cross-section is within specification or control limits of thermal dissipation for the object. For example, a control limit may specify that a thermal dissipation rate for each cross section is within 80 percent of an average thermal dissipation rate for the object. The thermal dissipation support may absorb heat away from the object. A thermal dissipation support may be a sacrificial support that is not part of the object and is separated from the object by a portion of unfused powder. For example, a sacrificial support may be built next to the object and may be discarded when performing post-processing on the object. In an aspect, the thermal dissipation support has a greater mass than the object and absorbs heat from the object. Moreover, the sacrificial structure has a higher thermal conductivity than unfused powder. Accordingly, the sacrificial structure helps dissipate heat. For example, when the sacrificial structure is in contact or close proximity to the build plate 114, the sacrificial structure dissipates heat into the build plate 114. The methods disclosed herein for fabricating an object using thermal dissipation supports may be performed by the apparatus 100 (FIG. 1), a person operating the apparatus 100, or a computer processor controlling the apparatus 100.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

Figure 2:
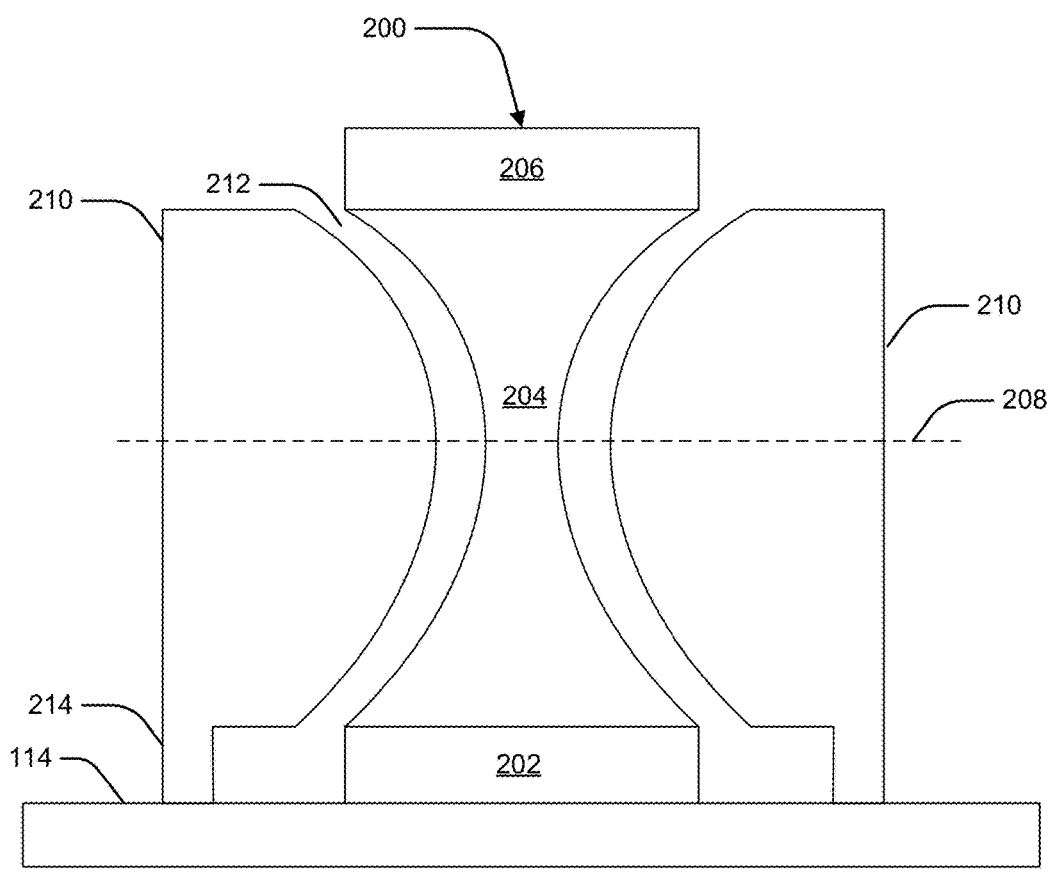
FIG. 2 illustrates a vertical cross-sectional view of an example object and a thermal dissipation support according to an aspect of the present disclosure.

FIG. 2 illustrates a vertical cross-sectional view of an example object 200 and thermal dissipation support 210 according to an aspect of the present disclosure. The object 200 has a generally hour-glass shape including a base portion 202, a narrow middle portion 204, and a wider top portion 206. The base portion 202 is built directly on the build plate 114. The base portion 202 has a horizontal cross-section with sufficient area to allow for cooling. For example, the base portion 202 is built on the base plate 114 and has sufficient thermal coupling for heat to dissipate from a recently melted layer. Accordingly, the thermal dissipation support 210 may be spaced apart from the object 200 in the layers forming the base portion 202. The thermal dissipation support 210, however, includes a leg portion 214 that provides physical support for the thermal dissipation support 210 and also thermally couples the thermal dissipation support 210 to the build plate 114.

The narrow middle portion 204, however, has a smaller horizontal-cross sectional area. As the horizontal cross-sectional area of the object 200 decreases toward the narrow middle portion 204, each subsequent layer of the object 200 takes less time to scan. Moreover, without the thermal dissipation support 210, the narrow middle portion 204 is surrounded by unfused powder, which tends to thermally insulate the narrow middle portion 204. For example, at a layer 208, newly melted material may be unable to dissipate heat at a sufficient rate. The excess heat may lead to thermal gradients sufficient to cause warping or other deformations of the narrow middle portion 204. A threshold temperature gradient for a material (e.g., the powder) defines a temperature gradient above which deformations are likely. In an aspect, excess heat or temperature gradients may occur when the horizontal cross-sectional area of the object 200 in a layer is less than a threshold. The threshold area may be determined based on a thermal dissipation rate of a first portion of the object that is below the current build layer. The thermal dissipation rate indicates a rate at which the first portion of the object cools. The thermal dissipation rate may be modeled based on, for example, the size of the first portion of the object and the structures or powder surrounding the first portion of the object. For example, a portion of the object surrounded by powder cools more slowly than a portion of the object connected to a lower portion of the object. The thermal dissipation rate is used to determine a threshold time until the first portion of the object solidifies or reaches a desired temperature within a threshold limit temperature. The threshold time can be converted into a cross-sectional threshold area based on the laser scan parameters. Additionally, a threshold dissipation rate indicates a minimum thermal dissipation rate necessary to prevent deformation of the object, for example, when the time for building a layer is fixed based on parameters of an AM apparatus.

Accordingly, the thermal dissipation support 210 is placed in close proximity to the object 200 in the layers forming the narrow middle portion 204 for absorbing heat from a portion that may be prone to excessive heat. For example, the thermal dissipation support 210 is separated from the narrow middle portion 204 by a thin portion of unfused powder 212. The portion of unfused powder 212 has a minimum thickness sufficient to prevent the unfused powder 212 from fusing. The portion of unfused powder 212, however, still conducts heat from the narrow middle portion 204 to the thermal dissipation support 210. Additionally, the thermal dissipation support 210 has a greater mass than the object 200, at least at the narrow middle portion 204. The greater mass allows the thermal dissipation support 210 to absorb a large amount of heat energy and reduce the temperature of the narrow middle portion 204. The thermal dissipation support 210 is a sacrificial support that does not form a portion of the completed object 200. Instead, the thermal dissipation support 210 is removed from the object 200 and discarded or recycled. In an aspect, the thermal dissipation support 210 is designed to allow maintain a thermal dissipation rate of each layer of the object to be within 80 percent of an average thermal dissipation rate of the object. Accordingly, the thermal dissipation support 210 includes a larger fused region in layers where the object 200 has a smaller fused region.

The wider top portion 206, once again, has a horizontal cross-section with sufficient area to allow for sufficient cooling. Accordingly, the thermal dissipation support 210 does not extend to the height of the wider top portion. In an aspect, although heat from the wider top portion 206 may dissipate toward the narrow middle portion 204, the heat may also flow into the thermal dissipation support 210 via the narrow middle portion 204.

As illustrated, the thermal dissipation support 210 at least partially surrounds the object 200. In an aspect, the thermal dissipation support 210 includes one or more breaks or separation points such that the thermal dissipation support 210 may be easily removed from the object 200. It should be appreciated that the shape of the thermal dissipation support 210 may vary. The surface of the thermal dissipation support 210 that faces the object 200 generally conforms to the shape of the object 200. For example, the facing surfaces of the object 200 and the thermal dissipation support 210 may have similar curvature to keep a consistent separation between the object 200 and the thermal dissipation support 210. The separation distance may be varied to adjust a thermal dissipation rate of the object. Other portions of the thermal dissipation support 210, however, serve primarily to increase the mass of the thermal dissipation support 210. Accordingly, the shape of the thermal dissipation support 210 may be adapted to accommodate a particular object 200 and/or other objects within a build. For example, the leg 214 may be located anywhere that the object 200 does not contact the build plate 114. The size and shape of the leg 214 may be adjusted to control thermal dissipation into the build plate 114.

In an aspect, the horizontal cross-sectional area of the thermal dissipation support 210 in any layer is inversely proportional to the horizontal cross-sectional area of the object 200. The total horizontal cross-sectional area of the thermal dissipation support 210 and the object 200 may remain substantially constant such that the previously build layers are able to dissipate the heat from a newly added layer. For example, the total horizontal cross-sectional area of the object 200 and the thermal dissipation support 210 may vary by less than 10 percent while the horizontal-cross sectional area of the object 210 is less than a threshold area.

The thermal properties of the object 400 may be determined according to a thermal model. An example thermal model is described in, D. Rosenthal, "The theory of moving sources of heat and its application to metal treatments," Transactions of the American Society of Mechanical Engineers, vol. 68, pp. 849-866, 1946, which is incorporated herein by reference. Variations of the Rosenthal model are described in N. Christenson et al., "The distribution of temperature in arc welding," British Welding Journal, vol. 12, no. 2, pp. 54-75, 1965 and A. C. Nunes, "An extended Rosenthal Weld Model," Welding Journal, vol. 62, no. 6, pp. 165s-170s, 1983, both of which are incorporated herein by reference. Other thermal models are described in E. F. Rybicki et al., "A Finite-Element Model for Residual Stresses and Deflections in Girth-Butt Welded Pipes," Journal of Pressure Vessel Technology, vol. 100, no. 3, pp. 256-262, 1978 and J. Xiong et al., "Bead geometry prediction for robotic GMAW-based rapid manufacturing through a neural network and a second-order regression analysis," Journal of Intelligent Manufacturing, vol. 25, pp. 157-163, 2014, both of which are incorporated herein by reference. A thermal model may be used to determine the need for the thermal dissipation support 210 and the dimensions thereof based on a three-dimensional computer model (e.g., a computer aided design (CAD) model) of the object 200.

In an aspect, the analysis or modeling of an object 200 for any given layer is based on the immediately preceding layers and not any subsequent layers. The subsequent layers have not yet been fabricated and do not affect the thermal dissipation of the given layer. For example, the threshold for the horizontal cross-sectional area of the object 200 may be based on the layer 212 as well as a number of preceding layers. In another example, if an aspect ratio of the object 200 exceeds a threshold, a thermal dissipation support 210 may be added to the CAD model.

Figure 3:
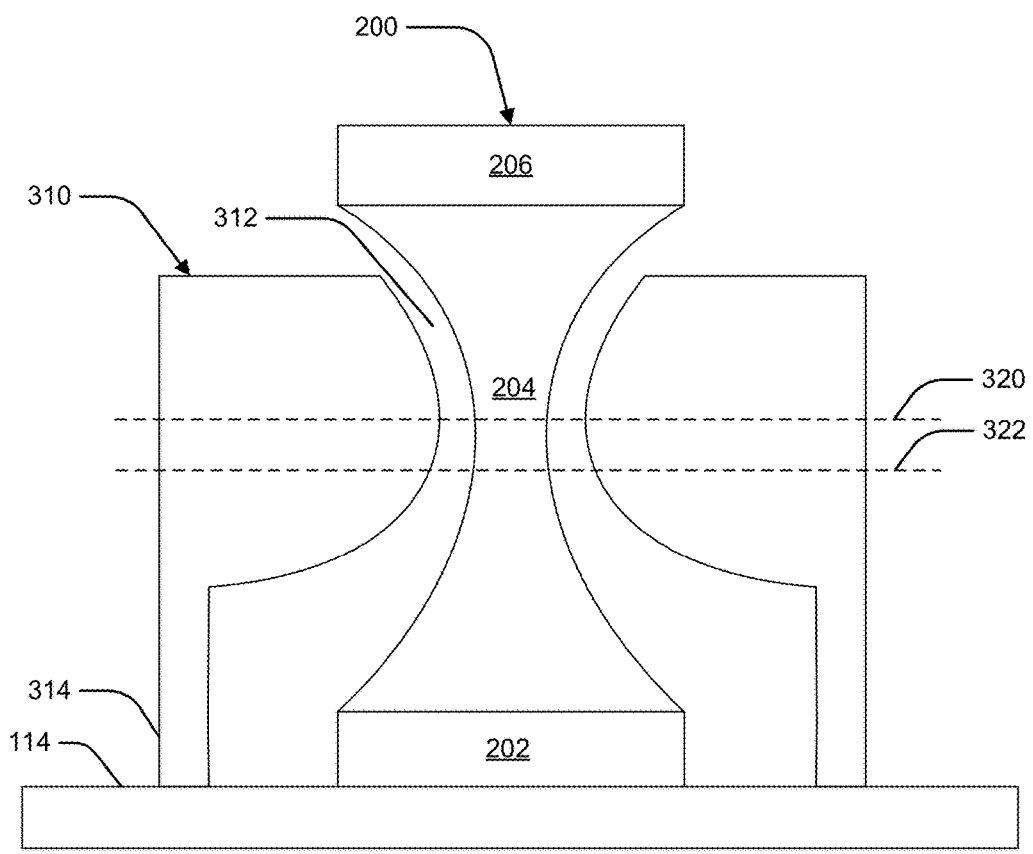
FIG. 3 illustrates a vertical cross-sectional view of the example object in FIG. 2 and another example thermal dissipation support according to an aspect of the present disclosure.

FIG. 3 illustrates another example of a thermal dissipation support 310 for the object 200. As illustrated in FIG. 3, two layers having the same horizontal cross-sectional area of the object 400 may have different sized layers of the thermal dissipation support 310. For example, the widest portion of the thermal dissipation support 310 is located at layer 320 slightly above the narrowest portion of the object 200. In the layer 322, the object 200 has the same cross-sectional area as in the layer 320, but the thermal dissipation support 310 does not need to be as large because the layers immediately preceding layer 322 have more mass than the layers immediately preceding layer 320. As illustrated, the layers of the narrow middle portion 204 immediately above the base portion 202 may be thermally decoupled from the leg 314. By adapting the thermal dissipation support 310 to the object 200 based on a thermal model of the object 200 including the layers immediately preceding a current build layer, the total mass of the thermal dissipation support 310 may be reduced in order to save resources such as build time, unfused powder, and energy.

In an aspect, the apparatus 100 further includes a thermal sensor such as a pyrometer or a thermal imaging camera. The thermal sensor provides information (e.g., a temperature) regarding the powder bed 112 or a portion of the object 200. The thermal sensor is used to determine thermal properties of the object 200 such as the thermal dissipation rate. The thermal properties of the object 200 are then used to dynamically adjust the dimensions of the thermal dissipation support 210 or 310 during the build. In another aspect, the dimensions of the thermal dissipation support 210 or 310 are adjusted for a subsequent build. For example, when empirical evidence from a build procedure indicates that deformation of the object is due to excessive thermal gradients during a build procedure a new thermal dissipation support may be added or an existing thermal dissipation support may be modified for a subsequent build. The empirical evidence may include measurements of a fabricated object from a previous build.

Figure 4:
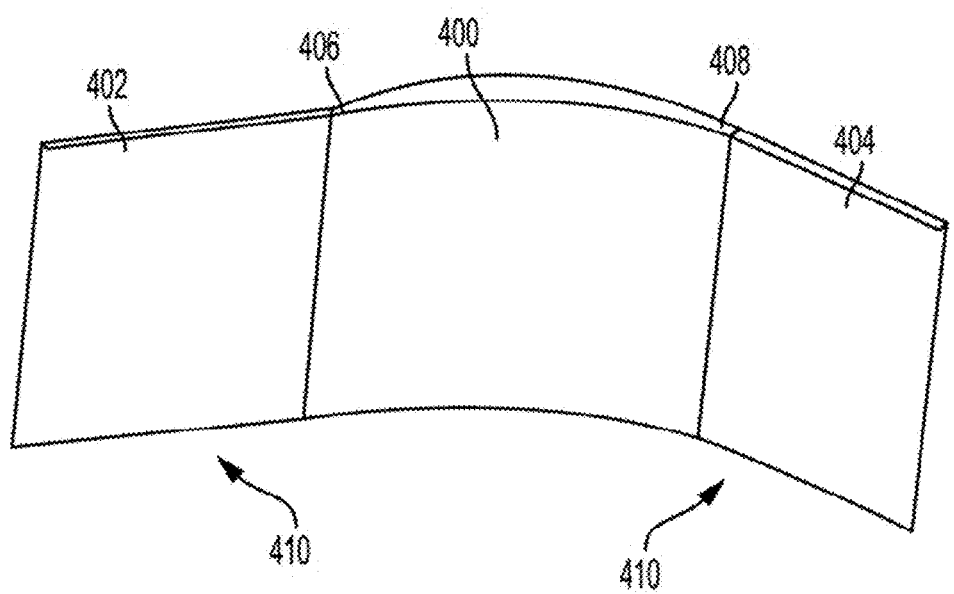
FIG. 4 illustrates a perspective view of another example thermal dissipation support according to an aspect of the present disclosure.

FIG. 4 illustrates a perspective view of another example thermal structure 410 for transferring heat from an object 400. The thermal structure 410 and the object 400 may be manufactured in the same manner discussed above using the apparatus 100 of FIG. 1.

In the example aspect illustrated in FIG. 4, the thermal structure 410 includes a first thermal structure 402 and a second thermal structure 404. The thermal structures 402, 404 extend from first and second ends 406, 408 of the object 400. As shown in FIG. 4, each of the thermal structures 402, 404 continues the contour of the ends 406, 408 of the object 400. For example, the object 400 curves and become narrower/thinner towards the ends 406, 408. The first and second thermal structures 402, 404 respectively have similar thicknesses to the ends 406, 408. As illustrated in FIG. 4, the first thermal structure 402 has about the same thickness and height as the end 406 of the object 400 and the second thermal structure 404 has about the same thickness and height as the end 408 of the object 400. The width of each of the first and second thermal structures 402, 404 is about 0.5 to 1.5 the width of the object 400 or about 0.75 to about 1.25 the width of the object. The thermal structures 402, 404 are relatively thin compared to the maximum thickness of the object 400. For example, the ratio of the maximum point of thickness of the object 400 to the thickness of the thermal structures 402, 404 may be about 5:1 to about 2:1, or about 4:1 to 3:1. Furthermore, the ratio of the height of the thermal structures 402, 404 to the thickness of thermal structures 402, 404 may be about 20:1 to about 10:1, about 18:1 to about 12:1, or about 16:1 to about 14:1. A length of the thermal structures 402, 404 is based on a thermal mass of the object 400. For example, the length of the thermal structures 402, 404 is selected such that the total mass of the thermal structures 402, 404 is greater than a mass of the object 400. By having these relative dimensions to the object, the thermal structures improve the transfer of heat away from the object 400.

Figure 5:
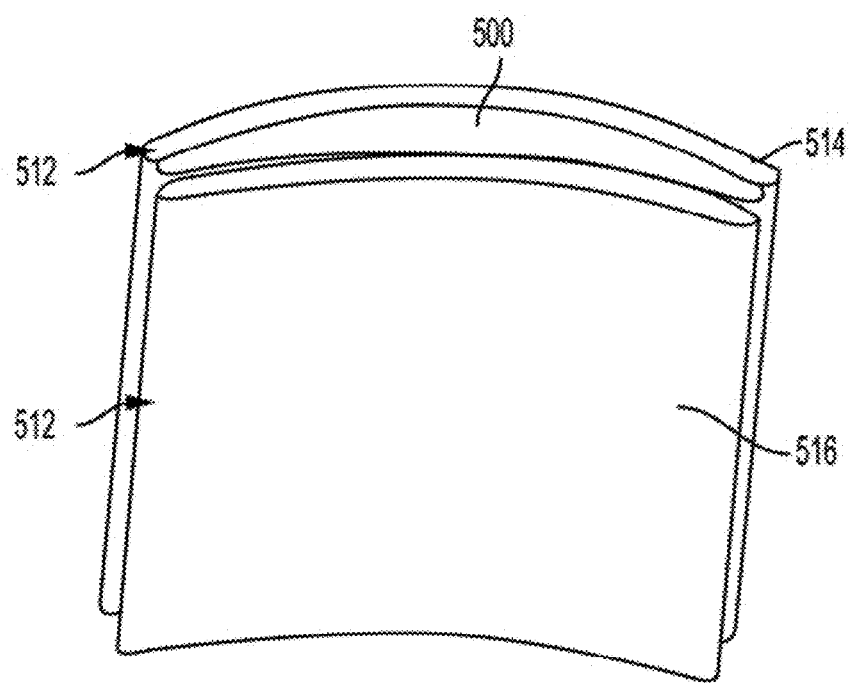
FIG. 5 illustrates a perspective view of another example thermal dissipation support according to an aspect of the present disclosure.

FIG. 5 illustrates a perspective view of an object 500 and a thermal structure 512. The thermal structure 512 and the object 500 may be manufactured in the same manner discussed above using the apparatus 100 of FIG. 1.

In the example aspect illustrated in FIG. 5, the thermal structure 512 includes a first thermal structure 514 and a second thermal structure 516. The thermal structures 514, 516 extend over opposing faces of the object 500, e.g., such that the object 500 is sandwiched between the first and second thermal structures 514, 516. As shown in FIG. 5, each of the thermal structures 514, 516 matches the contours of the object 500. For example, the surfaces of the object 500 curve, where the rear surface has a greater curve than the front surface. The first (rear) thermal structure 514 similarly matches the curvature of the rear face of the object 500 while the second (front) thermal structure 516 matches the curvature of the front surface of the object 500. As illustrated in FIG. 5, each of the first and second thermal structures 514, 516 has about (or exactly) the same height and width as the object 500. That is, the first thermal structure 514 about (or exactly) equally covers the surface area of rear surface while the second thermal structure 516 about (or exactly) equally covers the front surface. The ratio of the thickness of a thickest portion of the object 500 to each thickness of each of the thermal structures 514, 516 may be about 5:1 to about 2:1, or about 4:1 to about 3:1. The thermal structures 514, 516 may have a generally constant thickness such that in some areas, the thermal structures 514, 516 are thicker than adjacent portions of the object 500. A total mass of the thermal structures 514, 516 is greater than a mass of the object 500. By having these relative dimensions to the object, the thermal structures improve the transfer of heat away from the object through the front and rear of the object.

Figure 6:
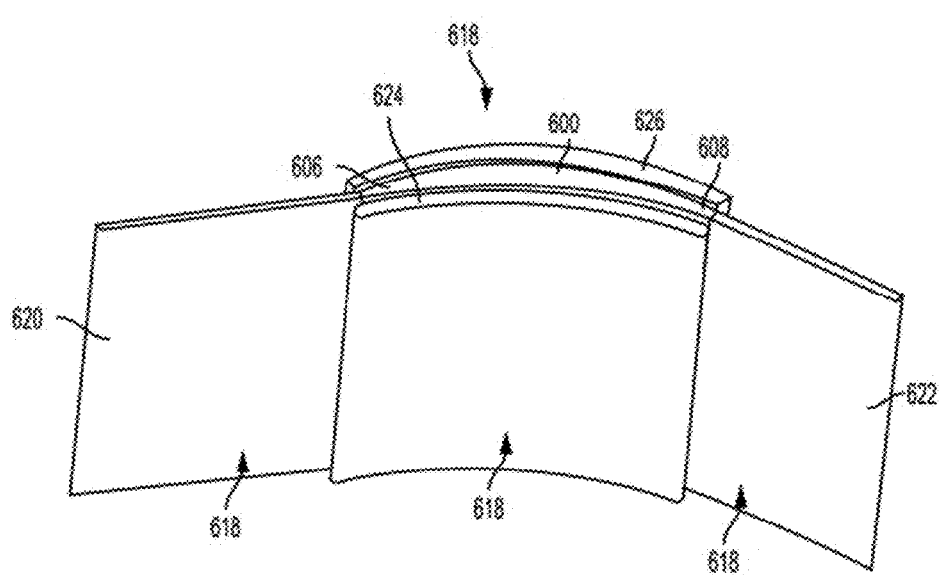
FIG. 6 illustrates a perspective view of another example thermal dissipation support according to an aspect of the present disclosure.

FIG. 6 illustrates a perspective view of an object 600 with another example thermal structure 618, where the thermal structure 618 includes thermal structures similar to both FIGS. 4 and 5. The thermal structure 618 and the object 600 may be manufactured in the same manner discussed above using the apparatus 100 of FIG. 1.

In the example aspect illustrated in FIG. 6, the thermal structure 618 includes a first thermal structure 620, a second thermal structure 622, a third thermal structure 624, and a fourth thermal structure 626. The first and second thermal structures 614, 616 have the same characteristics and relative dimensions as thermal structures 402, 404 discussed above with respect to FIG. 4. The third and fourth thermal structures 618, 620 have the same characteristics and relative dimension as thermal structures 514, 516 as discussed above with respect to FIG. 5. The ratio of the thickness of the third and fourth thermal structures 624, 626 to the thickness of the first and second thermal structures 620, 622 may be about 4:1 to about 1.5:1 or about 3:1 to about 2:1. By including all four thermal structures around the object 600, the thermal structure 620 of FIG. 6 draws heat away from the object 600 on both ends and also both the front and rear surfaces. Moreover, the mass of the thermal structure 618 is at least twice the mass of the object 600.

For each of thermal structures 410, 512, 618, there may be a gap between the thermal structures and the respective object 400, 500, 600 so that the thermal structures do not contact the object. The gap may be filled with a thin portion of unmelted powder. The presence of the unmelted powder still provides a mechanism for thermal coupling of the object and the thermal dissipation support without requiring a direct connection between the support structure and the object. Each of thermal structures 410, 512, 618 may further include one more connecting ribs integrally connected with the respective object 400, 500, 600. The connecting ribs would extend from any surface of the thermal structure that faces and/or abuts the object. The connecting ribs may be formed incrementally along the height of the thermal structures.

When it becomes necessary to remove the thermal structure 210, 310, 410, 512, 618 from the respective object 200, 300, 400, 500, 600, the operator may apply force to break the support structure free when connecting ribs are present. The thermal structure may be removed by mechanical procedures such as twisting, breaking, cutting, grinding, filing, or polishing. Additionally, thermal and chemical post processing procedures may be used to finish the object. When no connecting members are present and instead powder has been placed between the object and the thermal structure during manufacturing, the powder can simply be removed by blowing, for example.

In an aspect, multiple supports may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING", and filed Feb. 11, 2016;

U.S. patent application Ser. No. 15/042,024, titled "METHOD AND CONNECTING SUPPORTS FOR ADDITIVE MANUFACTURING", and filed Feb. 11, 2016;

U.S. patent application Ser. No. 15/041,973, titled "METHODS AND SURROUNDING SUPPORTS FOR ADDITIVE MANUFACTURING", and filed Feb. 11, 2016;

U.S. patent application Ser. No. 15/042,010, titled "METHODS AND KEYWAY SUPPORTS FOR ADDITIVE MANUFACTURING", and filed Feb. 11, 2016;

U.S. patent application Ser. No. 15/042,001, titled "METHODS AND BREAKABLE SUPPORTS FOR ADDITIVE MANUFACTURING", and filed Feb. 11, 2016;

U.S. patent application Ser. No. 15/041,991, titled "METHODS AND LEADING EDGE SUPPORTS FOR ADDITIVE MANUFACTURING", and filed Feb. 11, 2016; and U.S. patent application Ser. No. 15/041,980, titled "METHOD AND SUPPORTS WITH POWDER REMOVAL PORTS FOR ADDITIVE MANUFACTURING", and filed Feb. 11, 2016.

The disclosure of each of these applications are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
   (a) irradiating a layer of powder in a powder bed with an energy beam defining a laser in a series of scan lines to form a fused region;
   (b) providing a subsequent layer of powder over the powder bed by passing a recoater arm over the powder bed from a first side of the powder bed to a second side of the powder bed;
   (c) repeating steps (a) and (b) until the object and at least one support structure is formed in the powder bed, wherein the object defines a base portion, a middle portion, and a top portion atop one another, and wherein the support structure defines a surface conforming to one or more portions of the object, wherein the at least one support structure includes a sacrificial structure separated from the object by a portion of unfused powder, and wherein a rate of thermal dissipation from areas of each cross-section of the object are increased by a presence of the sacrificial structure to maintain a thermal dissipation rate of each cross-section such that thermal gradients in the object remain below a specified threshold that prevents deformation of the object, and
   (d) determining the rate of thermal dissipation of the object; and
   (e) adjusting a dimension of the sacrificial structure based on the determined rate of thermal dissipation of the object.

2. The method of claim 1, further comprising determining the rate of thermal dissipation from the areas of the cross-section of the object based on a thermal model of a build process for the object.

3. The method of claim 2, wherein the thermal model of the object is based on a horizontal cross-section of the object in a layer and the fused region in one or more preceding layers.

4. The method of claim 1, further comprising measuring the rate of thermal dissipation of the object based at least on using a pyrometer or thermal imaging camera.

5. The method of claim 1, wherein adjusting a dimension of the sacrificial structure based on the determined rate of thermal dissipation of the object comprises dynamically adjusting the dimension of the sacrificial structure.

6. The method of claim 1, wherein a mass of the sacrificial structure is greater than a mass of the object.

7. The method of claim 1, wherein the sacrificial structure maintains a substantially constant ratio between the fused region in each layer and a total area of the powder bed.

8. The method of claim 1, wherein a total fused region of the object and the at least one support structure in each layer exceeds a threshold area based on a thermal model.

9. The method of claim 1, wherein a surface of the sacrificial structure conforms to a surface of the object and is separated from the object by a portion of unfused powder.

10. The method of claim 1, wherein the sacrificial structure extends from a build plate to at least a height where a mass of the object exceeds a threshold mass based on a thermal model.

11. The method of claim 1, wherein the sacrificial structure extends from opposing vertically separated ends of the object.

12. The method of claim 1, wherein the sacrificial structure covers horizontally opposing faces of the object.

13. The method of claim 1, wherein a total mass of the at least one support structure is more than twice the mass of the object.

14. The method of claim 1, wherein the object has as a curved surface and the removable thermal structure has a corresponding curvature, wherein steps (a) and (b) are repeated until the object defines a plurality of portions of the object atop one another to define the curved surface.

15. The method of claim 1, wherein the object at least partially does not touch the sacrificial structure.

16. The method of claim 1, further comprising adjusting a dimension of the sacrificial structure based on empirical measurements of a previously fabricated object.

17. The method of claim 1, further comprising adding the sacrificial structure to a three dimensional model of the object based on an aspect ratio of the object exceeding a threshold.

18. The method of claim 1, wherein the specified threshold is based on thermal properties of the powder.

19. The method of claim 1, wherein the object defines a curved surface and the support structure defines a curvature corresponding to the curved surface of the object, and wherein the middle portion of the object is defined relatively narrower than one or more of the base portion or the top portion.

20. The method of claim 19, wherein the top portion is extended above the support structure.

21. The method of claim 1, wherein the mass of the sacrificial structure is greater than the mass of the object at the middle portion.

* * * * *